S. GRAHAM.
CAR-STARTER.

No. 192,984. Patented July 10, 1877.

WITNESSES;
J. Walter Fowler
Chas. O. Gill

INVENTOR;
Samuel Graham
By his attys.
Cox and Cox

UNITED STATES PATENT OFFICE.

SAMUEL GRAHAM, OF FREEPORT, ILLINOIS.

IMPROVEMENT IN CAR-STARTERS.

Specification forming part of Letters Patent No. 192,984, dated July 10, 1877; application filed June 7, 1877.

*To all whom it may concern:*

Be it known that I, SAMUEL GRAHAM, of Freeport, in the county of Stephenson and State of Illinois, have invented a new and useful Improvement in Car-Starters, of which the following is a specification, reference being had to the accompanying drawings.

The invention relates to an improved car-starter; and consists in the devices hereinafter specifically described, the object being to furnish an effective means of starting cars.

Figure 1:
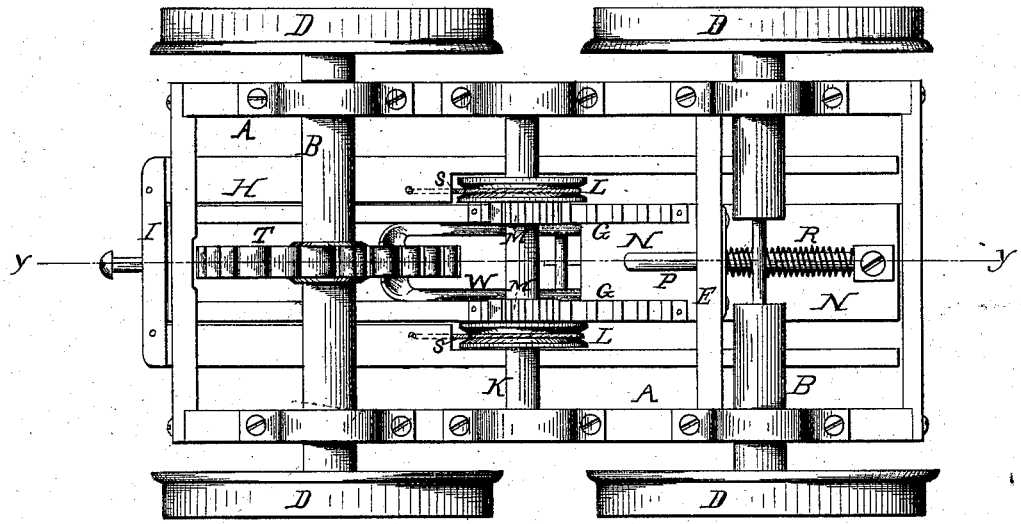
Figure 2:
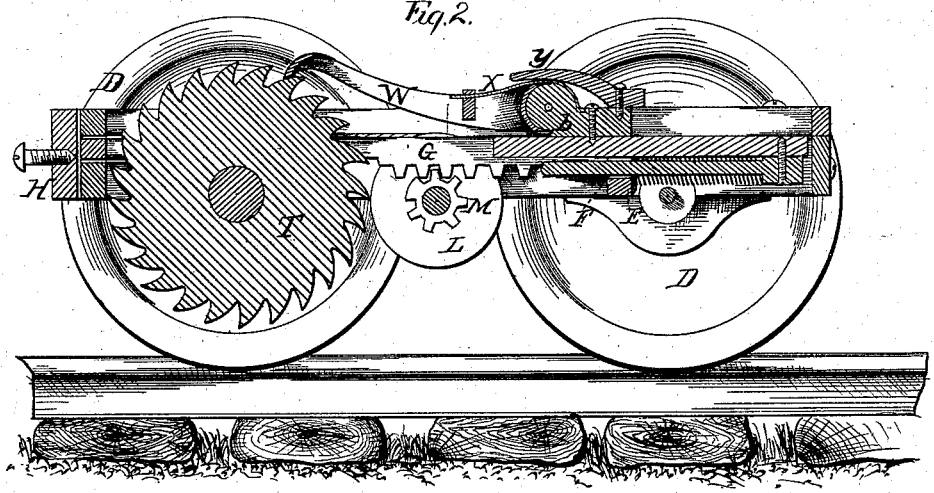

Figure 1 is a bottom plan view of a device embodying the elements of the invention. Fig. 2 is a central vertical longitudinal section of same.

In the accompanying drawings, A represents the lower frame of the car, which is provided with axles B and wheels D. About the center of the frame A is transversely secured the brace E, furnished with apertures F, in the two side ones of which move the rear ends of the forked sliding frame H, the forward ends moving in the slot formed in the front end of the frame A, and protruding beyond the same, where they are connected by the bar I, which is of greater dimensions than the slot, thus preventing the frame slipping too far rearward.

The axle K is journaled in the frame A, about midway between the front axle B and brace E, and is furnished with the grooved wheels L and pinions M, the teeth of which mesh with the teeth G, secured upon the lower surface of the sliding frame N, which is placed between the forked ends of the frame H, and is sustained in slots constructed in the brace E and forward end of the frame A.

Upon the lower surface of the rear of the frame N is secured the rear end of the horizontal bar P, the forward end of which extends frontward, and passes through an aperture formed in the brace E, wherein it moves. Around the said bar, between its rear end and the brace, is placed the helical spring R, which, when the frame is drawn forward, is retracted, and when the drawing power is removed or relieved the impetus of the spring forces the frame back to place.

At a proper place upon the periphery of the wheels L is attached one end of the ropes or chains S. The other end passes along the grooves constructed in the wheels, and extends forward, and is secured to the upper surface of the frame H in juxtaposition to the said wheels.

Upon the front axle B is secured the ratchet-wheel T, a portion of which protrudes upward in the space between the sides of the fork of the front part of the frame N a proper distance to engage the pawl W, hinged at its rear end to the block *b*, secured to the frame, and furnished with a spring, X, to give it a downward tension upon the ratchet.

To the brace E is secured the dog Y, the front end of which impinges the upper edge of the spring X, and thereby prevents it doubling or breaking.

The sliding frames are prevented from slipping forward too great a distance by pins secured on their upper surfaces and rearward by the block *b*, to which the pawl W is hinged.

In the operation of the device power is applied to the front end of the frame H, which, as the power is exerted, draws the ropes S. This causes the wheels L and pinions M to rotate, which pinions, meshing with the teeth G in their revolution, forces the frame N forward with the frame H. By this forward movement the end of the pawl W presses against the teeth of the ratchet-wheel T, and causes it and the forward axle and car-wheels to revolve, thereby carrying the car forward.

When the power is relieved the spring R quickly forces the frames back to place, and the pawl, pressing against the ratchet, prevents the forward axle and wheels returning to their former position. The above operation may be repeated as often as required.

What I claim as my invention, and desire to secure by Letters Patent, is—

1. The sliding frames H N, in combination with the grooved wheels L, ropes or chains S, pinions M, teeth G, ratchet T, and pawl W, substantially as set forth.

2. The sliding frame N, provided with bar P, spring R, and teeth G, in combination with the frame H, wheels L, ropes S, pinions M, ratchet T, and pawl W, substantially as specified.

In testimony that I claim the foregoing improvement in car-starters as above described, I have hereunto set my hand this 31st day of May, 1877.

SAMUEL GRAHAM.

Witnesses:
HIRAM BRIGHT,
ROBERT H. WILES.